US012248086B2

(12) United States Patent
Nakashima et al.

(10) Patent No.: US 12,248,086 B2
(45) Date of Patent: Mar. 11, 2025

(54) POSITION ESTIMATION DEVICE, POSITION ESTIMATION SYSTEM, AND POSITION ESTIMATION METHOD

(71) Applicant: DENSO CORPORATION, Kariya (JP)

(72) Inventors: Kazuhiro Nakashima, Kariya (JP); Kenichirou Sanji, Nisshin (JP)

(73) Assignee: DENSO CORPORATION, Kariya (JP)

( * ) Notice: Subject to any disclaimer, the term of this patent is extended or adjusted under 35 U.S.C. 154(b) by 678 days.

(21) Appl. No.: 17/453,978

(22) Filed: Nov. 8, 2021

(65) Prior Publication Data

US 2022/0057475 A1  Feb. 24, 2022

Related U.S. Application Data

(63) Continuation of application No. PCT/JP2020/019276, filed on May 14, 2020.

(30) Foreign Application Priority Data

May 22, 2019 (JP) .................... 2019-095733

(51) Int. Cl.
*B60R 25/24* (2013.01)
*B60R 25/30* (2013.01)
*E05B 49/00* (2006.01)
*G01S 5/00* (2006.01)
*G01S 5/02* (2010.01)
*G01S 5/10* (2006.01)
*G01S 13/76* (2006.01)
*G07C 9/00* (2020.01)

(52) U.S. Cl.
CPC ................ *G01S 5/10* (2013.01); *B60R 25/30* (2013.01)

(58) Field of Classification Search
CPC ......... B60R 25/30; B60R 25/24; E05B 49/00; G07C 9/00309; G07C 2009/00793; G07C 2209/63; G01S 5/10; G01S 5/0284; G01S 13/765; G01S 2205/01; G01S 5/017
USPC ......................................................... 701/408
See application file for complete search history.

(56) References Cited

U.S. PATENT DOCUMENTS

| 2016/0101745 A1 | 4/2016 | Siswick et al. |
| 2017/0369006 A1 | 12/2017 | Siswick et al. |
| 2018/0099643 A1* | 4/2018 | Golsch ................ G01S 13/765 |
| 2019/0122464 A1* | 4/2019 | DeLong ................ B60R 25/20 |
| 2019/0202445 A1* | 7/2019 | Lavoie ................ G05D 1/0022 |

(Continued)

FOREIGN PATENT DOCUMENTS

| JP | 6212204 B2 | 10/2017 |
| JP | 2019085734 A | 6/2019 |

*Primary Examiner* — Rachid Bendidi
*Assistant Examiner* — Hossam M Abd El Latif
(74) *Attorney, Agent, or Firm* — Harness, Dickey & Pierce, P.L.C.

(57) ABSTRACT

A distance data between the portable device and the vehicle-side transmission and reception device is acquired. A movement speed of the portable device is calculated based on a change between a current distance data and a previous distance data. A position estimation distance for estimating the position of the portable device with respect to the vehicle is updated when the movement speed is less than a first speed. The position estimation distance is not updated when the movement speed is equal to or larger than the first speed. The position of the portable device is estimated according to the position estimation distance.

11 Claims, 13 Drawing Sheets

(56) References Cited

U.S. PATENT DOCUMENTS

| | | | |
|---|---|---|---|
| 2020/0103487 A1* | 4/2020 | Tzirkel-Hancock | G01S 3/808 |
| 2020/0132473 A1* | 4/2020 | Shipley | G01C 21/1652 |
| 2020/0238952 A1* | 7/2020 | Lindsay | G06V 30/194 |
| 2020/0273197 A1* | 8/2020 | Zhao | G01S 5/0295 |

* cited by examiner

POSITION ESTIMATION DEVICE, POSITION ESTIMATION SYSTEM, AND POSITION ESTIMATION METHOD

CROSS REFERENCE TO RELATED APPLICATION

The present application is a continuation application of International Patent Application No. PCT/JP2020/019276 filed on May 14, 2020, which designated the U.S. and claims the benefit of priority from Japanese Patent Application No. 2019-095733 filed on May 22, 2019. The entire disclosures of all of the above applications are incorporated herein by reference.

TECHNICAL FIELD

The present disclosure relates to a technique for estimating the position of a portable device with respect to a vehicle.

BACKGROUND

Conceivable technique provides a vehicle communication system that includes an electronic control unit mounted on a vehicle and a mobile communication unit carried by a user of the vehicle, and estimates the position of the mobile communication unit. In this system, the position of the mobile communication unit is estimated based on the time required for transmitting and receiving signals between the electronic control unit and the mobile communication unit.

SUMMARY

According to example embodiments, a distance data between the portable device and the vehicle-side transmission and reception device is acquired. A movement speed of the portable device is calculated based on a change between a current distance data and a previous distance data. A position estimation distance for estimating the position of the portable device with respect to the vehicle is updated when the movement speed is less than a first speed. The position estimation distance is not updated when the movement speed is equal to or larger than the first speed. The position of the portable device is estimated according to the position estimation distance.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
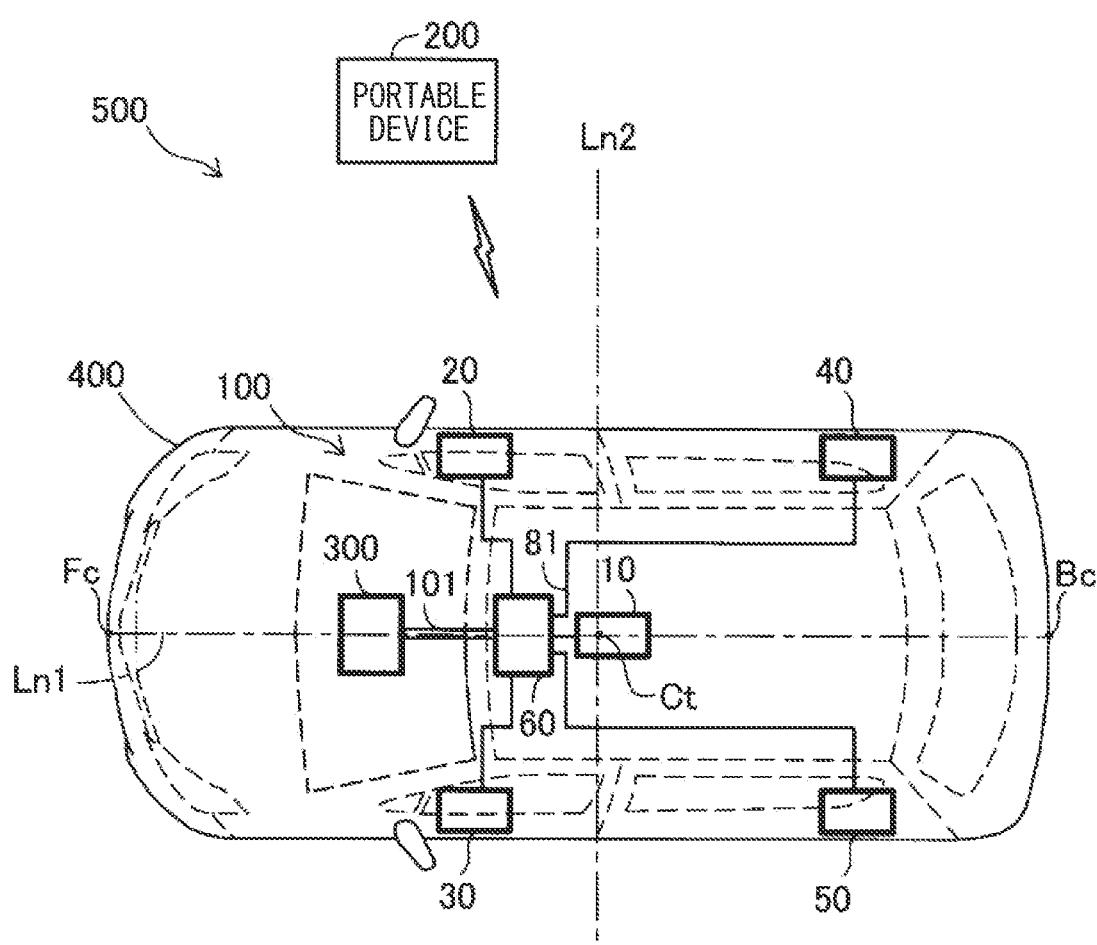
FIG. 1 is a diagram showing a position estimation system.

When there is an obstacle such as a human body between the portable device carried by the user and the vehicle, the signal transmitter/receiver on the vehicle side receives the signal transmitted from the portable device as a reflected wave due to the obstacle or the like. Therefore, there may be a possibility that the error in position estimation would be larger than in the case of position estimation using direct waves. Therefore, a technique for suppressing the influence of an error and improving the accuracy of estimating the position of the portable device with respect to the vehicle has been desired.

The present embodiments can be realized as the following embodiments.

According to the first aspect of the present embodiments, there is provided a position estimation device that is mounted on a vehicle and estimates the position of a portable device carried by a user of the vehicle. This position estimation device includes: a vehicle-side transmitter/receiver that transmits and receives signals to and from the portable device; a distance data acquisition unit that acquires a distance data between the portable device and the vehicle-side transmitter/receiver using the signal received from the portable device by the vehicle-side transmitter/receiver; a movement speed calculation unit that calculates the movement speed of the portable device based on a change between the current distance data newly acquired as the distance data and a previous distance data acquired as the distance data before the current distance data; an update unit that executes a selective update process, which is a process that updates a position estimation distance for estimating the position of the portable device with respect to the vehicle using the current distance data when the movement speed is less than a first speed preliminarily determined based on a movement speed range of the user, and does not update the position estimation distance using the current distance data when the movement speed is equal to or larger than the first speed; and a position estimation unit that estimates the position of the portable device with respect to the vehicle using the position estimation distance.

According to the position estimation device of this feature, when the moving speed of the portable device is less than the first speed determined based on the moving speed range of the user, the newly acquired distance data, which is the current distance data, is used, so that the position estimation distance for estimating the position of the portable device with respect to the vehicle is updated, and the above update is not performed when the speed is equal to or higher than the first speed. Therefore, it is possible to prevent the estimation of the position of the portable device by using the updated position estimation distance when the moving speed of the portable device is an abnormal value equal to or higher than the first speed, and the accuracy of the operation for estimating the position of the portable device with respect to the vehicle can be improved.

According to the second aspect of the present embodiments, there is provided a position estimation method for estimating the position of a portable device carried by a user of the vehicle with respect to the vehicle. The vehicle is equipped with a vehicle-side transmitter/receiver that transmits/receives signals to/from the portable device, and the method includes: acquiring a distance data between the portable device and the vehicle-side transmitter/receiver using the signal received from the portable device by the vehicle-side transmitter/receiver; calculating the movement speed of the portable device based on a change between the current distance data newly acquired as the distance data and a previous distance data acquired as the distance data before the current distance data; updating a position estimation distance for estimating the position of the portable device with respect to the vehicle using the current distance data when the movement speed is less than a first speed preliminarily determined based on a movement speed range of the user; not updating the position estimation distance using the current distance data when the movement speed is equal to or larger than the first speed; and estimating the position of the portable device with respect to the vehicle using the position estimation distance.

According to the position estimation device of this feature, when the moving speed of the portable device is less than the first speed determined based on the moving speed range of the user, the newly acquired distance data, which is the current distance data, is used, so that the position estimation distance for estimating the position of the portable device with respect to the vehicle is updated, and the above update is not performed when the speed is equal to or higher than the first speed. Therefore, it is possible to prevent the estimation of the position of the portable device by using the updated position estimation distance when the moving speed of the portable device is an abnormal value equal to or higher than the first speed, and the accuracy of the operation for estimating the position of the portable device with respect to the vehicle can be improved.

A. First Embodiment

The position estimation system 500 shown in FIG. 1 includes a position estimation device 100 mounted on the vehicle 400 and a portable device 200 carried by a user of the vehicle 400. The position estimation system 500 is a system that estimates the position of the portable device 200 with respect to the vehicle 400 by wirelessly communicating with each other between the position estimation device 100 and the portable device 200.

In the present embodiment, the position estimation device 100 is configured to realize remote keyless entry and smart entry. The remote keyless entry means that, when a user of the vehicle 400 operates the portable device 200, a door of the vehicle 400 is opened, closed, unlocked, locked, and the like according to the operation. The smart entry means that the door of the vehicle 400 is unlocked when the user of the vehicle 400 carrying the portable device 200 enters a wireless communication area near the vehicle 400, and that the vehicle 400 is activated by operating the switch by the user while carrying the portable device 200 in a compartment of the vehicle 400.

Figure 2:
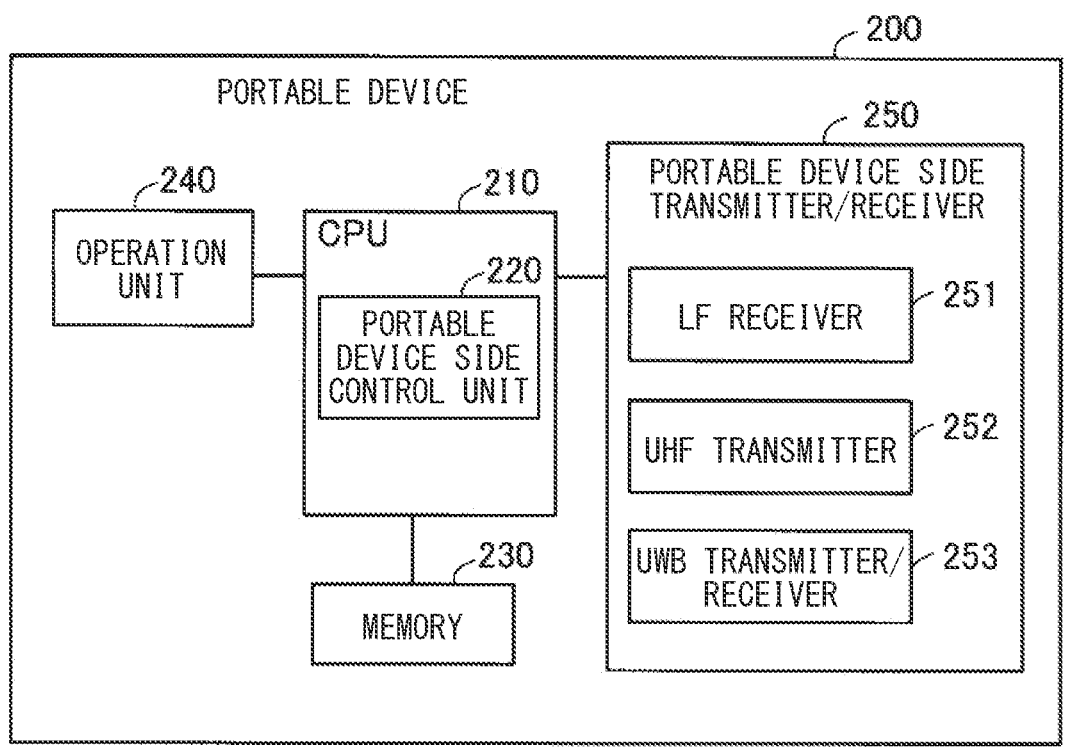
FIG. 2 is a block diagram showing a configuration of a portable device.

The portable device 200 is used by being carried by a user as an electronic key for the vehicle 400. As the portable device 200, for example, in addition to a dedicated device for an electronic key, a mobile communication terminal having a function as an electronic key may be used. As shown in FIG. 2, the portable device 200 includes a CPU 210, a memory 230, an operation unit 240, and a portable device side transmitter/receiver 250. Each part is connected to each other by a bus. The CPU 210 functions as a portable device side control unit 220 by reading-out and executing a program stored in the memory 230. An identifier (ID) is stored in the memory 230. The operation unit 240 has a switch for instructing an operation such as opening/closing operations of the door of the vehicle 400. A touch panel may be used instead of the switch.

portable device side transmitter/receiver 250 is configured to enable wireless communication with the position estimation device 100. In the present embodiment, wireless communication includes communication using radio waves in the LF (Low Frequency) band, radio waves in the UHF (Ultra High Frequency) band, and communication using radio waves in the UWB (Ultra Wide Band) band. The LF band means, for example, a frequency band of 30 kHz to 300 kHz. The UHF band means, for example, a frequency band of 300 MHz to 3 GHz. The UWB band means, for example, a frequency band of 500 MHz or higher. The pulse width of the UWB signal is, for example, 2 ns.

The portable device side transmitter/receiver 250 includes an LF receiver 251, a UHF transmitter 252, and a UWB transmitter/receiver 253. Although not shown, the portable device side transmitter/receiver 250 includes an antenna for transmitting/receiving signals.

The LF receiver 251 is configured to be capable of receiving LF band signals (hereinafter, also referred to as "LF signals"). When the LF receiver 251 receives the LF signal, the device 251 performs electrical processing such as amplification and coding of the signal to generate a received signal, and outputs the received signal to the portable device side control unit 220. The UHF transmitter 252 is configured to be capable of transmitting UHF band signals (hereinafter, also referred to as "UHF signals"). The UHF transmitter 252 performs electrical processing such as modulation and amplification of the original signal input from the portable device side control unit 220 to generate a UHF signal, and transmits the UHF signal to the periphery of the portable device 200. The UWB transmitter/receiver 253 is configured to be capable of transmitting/receiving signals in the UWB band (hereinafter, also referred to as "UWB signals"). When the UWB transmitter/receiver 253 receives the UWB signal, it performs electrical processing such as amplification and coding of the signal to generate a received signal, and outputs the received signal to the portable device side control unit 220. Further, the UWB transmitter/receiver 253 performs electrical processing such as modulation and amplification of the original signal input from the portable device side control unit 220 to generate a UWB signal, and transmits the UWB signal to the periphery of the portable device 200.

The portable device side control unit 220 controls the portable device 200 as a whole. When the portable device side control unit 220 receives the request signal as the LF signal via the portable device side transmitter/receiver 250, the portable device side control unit 220 generates a response original signal corresponding to the request signal including the ID stored in the memory 230, and outputs it as a UHF signal to the portable device side transmitter/receiver 250. When a UWB signal is input from the UWB transmitter/receiver 253, the portable device side control unit 220 is configured to return the UWB signal as a response signal from the UWB transmitter/receiver 253.

Figure 3:
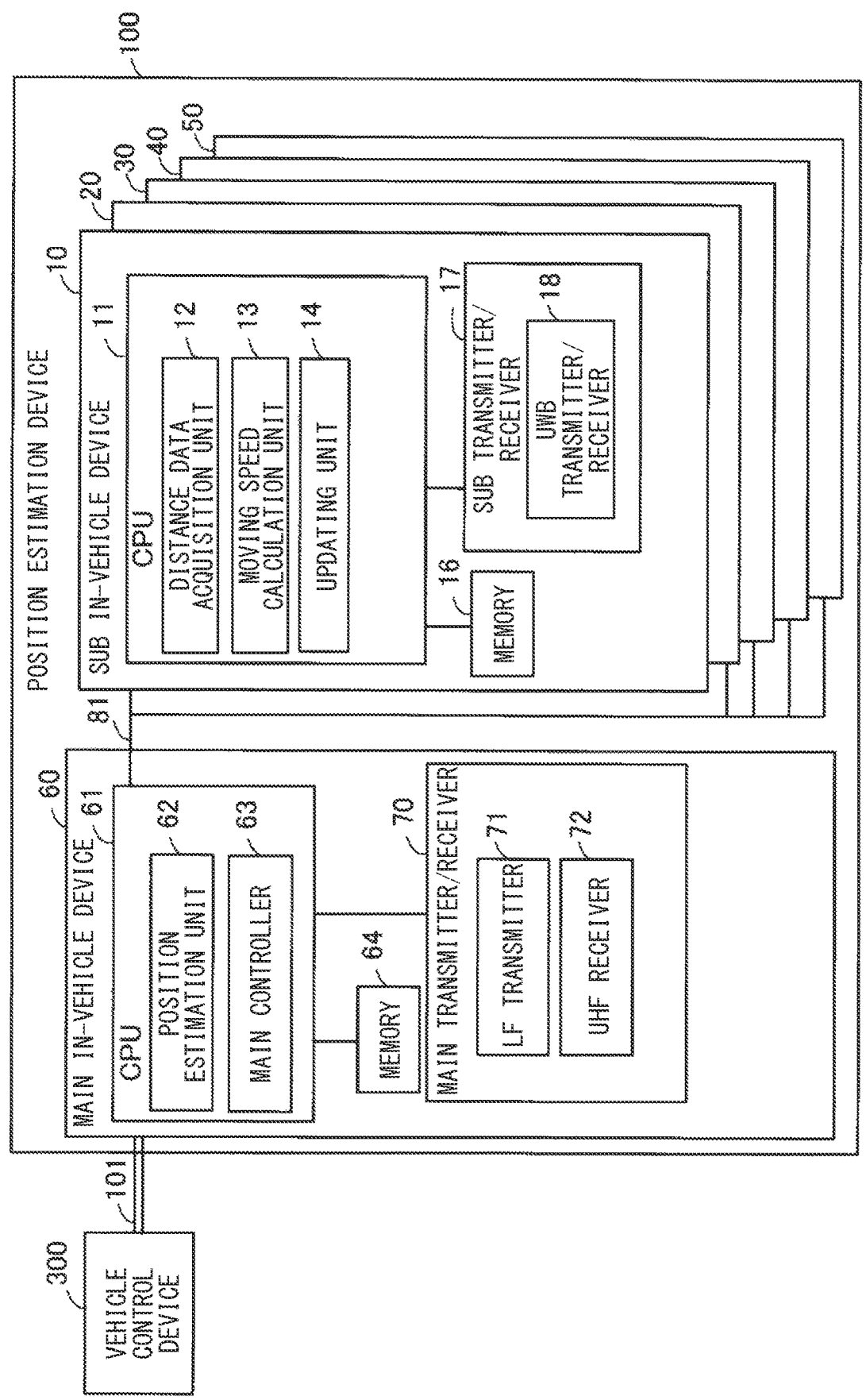
FIG. 3 is a block diagram showing a configuration of a position estimation device.

As shown in FIGS. 1 and 3, the position estimation device 100 includes a main in-vehicle device 60 and sub in-vehicle devices 10, 20, 30, 40, and 50. The main in-vehicle device 60 is interconnected with the vehicle control device 300 via a CAN (Control Area Network) bus 101. The vehicle control device 300 is an ECU used for controlling the vehicle 400, such as a body ECU (Electronic Control Unit) that controls the opening and closing of the door of the vehicle 400, and an engine ECU that controls the start and stop of the engine of the vehicle 400. The main in-vehicle device 60 is interconnected with the sub in-vehicle devices 10 to 50 via a LIN (Local Interconnect Network) 81. As the communication bus, a multimedia communication bus, a power train communication bus, a body communication bus, or the like other than the above may be used, and CXPI (Lock Extension Peripheral Interface, registered trademark), FlexRay (registered trademark), MOST (Media Oriented Systems Transport, registered trademark) or the like may be also used.

As shown in FIG. 1, the sub in-vehicle device 10 is arranged at the center Ct of the vehicle 400. The center Ct of the vehicle 400 is an intermediate point of a line segment (i.e., a straight line Ln1) connecting the central portion Fc of the front end portion of the vehicle 400 in the vehicle width direction and the central portion Bc of the rear end portion of the vehicle 400 in the vehicle width direction. The straight line Ln2 shown in FIG. 1 is a straight line that is parallel to the vehicle width direction of the vehicle 400 and passes through the center Ct. Hereinafter, the right side of the vehicle 400 is also referred to as "one side", and the left side of the vehicle 400 is also referred to as "the other side". The sub in-vehicle device 20 is arranged near the front right door of the vehicle 400. It can be said that the sub in-vehicle device 20 is located on the front side of the straight line Ln2 and is arranged on one side of the straight line Ln1. The sub in-vehicle device 30 is arranged near the front left door of the vehicle 400. The sub in-vehicle device 30 is arranged at a position symmetrical to the sub in-vehicle device 10 with respect to the straight line Ln1. The sub in-vehicle device 40 is arranged near the rear right door of the vehicle 400. It can be said that the sub in-vehicle device 40 is located on the rear side of the straight line Ln2 and is arranged on one side of the straight line Ln1. The sub in-vehicle device 50 is arranged at a position symmetrical to the sub in-vehicle device 40 with respect to the straight line Ln1. The sub in-vehicle device 20 and the sub in-vehicle device 50 face each other with the vehicle center Ct in between, and the sub in-vehicle device 30 and the sub in-vehicle device 40 face each other with respect to the vehicle center Ct in between. In another form, a sub in-vehicle device similar to the sub in-vehicle devices 10 to 50 may be arranged near the door for opening and closing the trunk room provided behind the vehicle 400. Further, the sub in-vehicle device similar to the sub in-vehicle devices 10 to 50 may be arranged at positions facing the sub in-vehicle device arranged near the door of the trunk room with the vehicle center Ct interposed therebetween. "Two sub in-vehicle devices face each other with the vehicle center Ct in between" may not be limited to the case where the vehicle center Ct is located on a straight line connecting the two sub in-vehicle devices. For example, it may include a case where a straight line connecting one sub in-vehicle device and the vehicle center Ct and a straight line connecting the other sub in-vehicle device and the vehicle center Ct intersect at an arbitrary angle of 120° or more and 180° or less. From the viewpoint of improving the accuracy of estimating the position of the portable device 200 with respect to the vehicle 400, it may be preferable that the sub in-vehicle devices 10 to 50 are arranged with respect to the vehicle 400 so that the portable device 200 can communicate with at least two sub in-vehicle devices at the same time.

As shown in FIG. 3, the sub in-vehicle device 10 includes a CPU 11, a memory 16, a sub transceiver 17, and an input/output interface (not shown). The CPU 11 functions as a distance data acquisition unit 12, a movement speed calculation unit 13, and an update unit 14 by reading out and executing a program stored in the memory 16.

The sub transmitter 17 includes a UWB transmitter/receiver 18. Although not shown, the sub transmitter 17 includes an antenna for transmitting and receiving UWB signals. The UWB transmitter/receiver 18 is configured to be capable of transmitting/receiving UWB signals. When the UWB transmitter/receiver 18 receives the UWB signal, it performs electrical processing such as amplification and coding of the signal to generate a received signal, and outputs the received signal to the CPU 11. The UWB transmitter/receiver 18 performs electrical processing such as modulation and amplification of the original signal input from the CPU 11 to generate a UWB signal, and transmits the UWB signal to the periphery of the sub in-vehicle device 10.

The distance data acquisition unit 12 repeatedly calculates and acquires the distance data between the portable device 200 and the sub in-vehicle device 10 using the UWB signal received from the portable device 200 by the sub transmitter/receiver 17. In the present embodiment, the distance data acquisition unit 12 uses the time required for transmitting and receiving the UWB signal between the portable device 200 and the sub transmitter 17 (hereinafter, a flight time) to calculate and acquire the distance data between the portable device 200 and the sub in-vehicle device 10. More specifically, the distance data acquisition unit 12 measures the flight time, calculates and acquires the distance using the flight time and the propagation speed of the UWB signal. The flight time can be measured, for example, by counting clock signals input from a clock transmitter (not shown) provided in the sub in-vehicle device 10 or the portable device 200. The portable device 200 may constantly transmit and receive signals to and from the position estimation device 100, or may transmit and receive the signal when a predetermined condition is satisfied. The predetermined condition is, for example, that the portable device 200 is authenticated as a proper portable device 200 registered in the position estimation device 100 by the authentication process described later, or that the door of the vehicle 400 is opened by the user, or that the engine switch of the vehicle 400 has been turned on. When the transmission/reception of signals is started after a predetermined condition is satisfied, the power consumption of the portable device 200 can be suppressed.

The moving speed calculation unit 13 repeatedly calculates the moving speed V of the portable device 200 based on the change of the current distance data D1 which is the newly acquired distance data and the previous distance data D2 acquired before the current distance data. Specifically, the moving speed V of the portable device 200 is calculated by using the difference between the current distance data D1 and the previous distance data D2 and the time difference from the time when the previous distance data D2 was acquired to the time when the current distance data D1 was acquired.

The update unit 14 executes a selective update process, which is a process of updating the position estimation distance or not updating the position estimation distance according to the moving speed V. The position estimation distance is a distance used in the position estimation process described later. In the selective update process, the update unit 14 updates the past position estimation distance by using the current distance data D1 when the moving speed V is less than the first speed V1. In this case, the update unit 14 specifies the position estimation distance updated using the current distance data D1 as the latest distance between the sub in-vehicle device 10 and the portable device 200. The first speed V1 is set in advance by experiments or the like as a value larger than the upper limit of the speed range estimated as the moving speed of the user. Further, in the first update process, when the moving speed V is equal to or higher than the first speed V1, the update unit 14 does not update the position estimation distance using the current distance data D1. In this case, the update unit 14 specifies the position estimation distance updated immediately before as the latest distance between the sub in-vehicle device 10 and the portable device 200. The reliability of the position estimation distance can be improved by using the moving average value of the current distance data and the previous distance data for a predetermined number of times used for calculating the movement speed as the position estimation distance.

In the present embodiment, the updating unit 14 further updates the previous distance data D2 for calculating the moving speed with the current distance data D1 when the moving speed V is less than the first speed V1. Further, the updating unit 14 uses the previous distance data D2 for calculating the moving speed as the current distance data D1 and does not update the previous distance data D2 when a predetermined speed condition including that the moving speed V is equal to or higher than the first speed V1 is satisfied. In the present embodiment, the speed condition is that a predetermined second speed V2 or higher, which is larger than the first speed V1, does not continue for a predetermined number of times in a predetermined period. In the selective update process in the present embodiment, when the moving speed V is equal to or higher than the first speed V1 and lower than the second speed V2, or when the moving speed V equal to or higher than the second speed V2 continues for a predetermined number of times in the predetermined period, the previous distance data D2 for calculating the moving speed is updated with the current distance data D1, and the position estimation distance is not updated. Further, when the movement speed V equal to or higher than the second speed V2 does not continue for a predetermined number of times in a predetermined period, the previous distance data D2 is not updated by the current distance data D1 and the position estimation distance is not updated.

The configurations of the sub in-vehicle devices 20 to 50 are the same as the sub in-vehicle device 10. That is, the distance data acquisition unit 12 included in each sub in-vehicle device acquires the distance data between each sub in-vehicle device and the portable device 200, and the movement speed calculation unit 13 of each sub in-vehicle device calculates the movement speed V. The update unit 14 of each sub in-vehicle device 20 to 50 executes the selective update process. In the present specification, a transmitter/receiver provided in the position estimation device 100 and transmitting/receiving a signal for calculating and acquiring distance data with the portable device 200 is also referred to as a "vehicle-side transceiver". In the present embodiment, the sub transmitter/receiver 17 of each sub in-vehicle device 10 to 50 corresponds to the "vehicle-side transceiver".

The main in-vehicle device 60 includes a CPU 61, a memory 64, a main transmitter/receiver 70, and an interface (not shown). The CPU 61 functions as the position estimation unit 62 and the main control unit 63 by reading out and executing the program stored in the memory 64. An ID unique to the position estimation device 100 is stored in the memory 64. The ID stored in the memory 64 of the main in-vehicle device 60 is the same as the ID stored in the memory 230 of the portable device 200. That is, a common ID is set in advance in the portable device 200 and the position estimation device 100.

The main transmitter/receiver 70 includes an LF transmitter 71 and a UHF receiver 72. Although not shown, the main transmitter/receiver 70 includes an antenna for transmitting/receiving signals. The LF transmitter 71 is configured to be capable of transmitting an LF signal. The LF transmitter 71 performs electrical processing such as modulation and amplification of the original signal input from the CPU 61 to generate an LF signal, and transmits the LF signal to the periphery of the vehicle 400. The UHF receiver 72 is configured to be able to receive UHF signals. When the UHF receiver 72 receives the UHF signal, it performs electrical processing such as amplification and coding of the signal to generate a received signal, and outputs the received signal to the CPU 61. The main transmitter/receiver 70 may be further configured to be capable of transmitting/receiving UWB signals, or may be configured to perform communication using the BLE standard.

The position estimation unit 62 executes a position estimation process for estimating the position of the portable device 200 with respect to the vehicle 400. In the present embodiment, the position estimation unit 62 repeatedly estimates the position of the portable device 200 with respect to the vehicle 400 by using the latest position estimation distance input from the sub in-vehicle devices 10 to 50. The main control unit 63 controls the main in-vehicle device 60 as a whole. Further, the main control unit 63 executes an authentication process for authenticating that the portable device 200 is a legitimate portable device 200 registered in the position estimation device 100.

Figure 4:
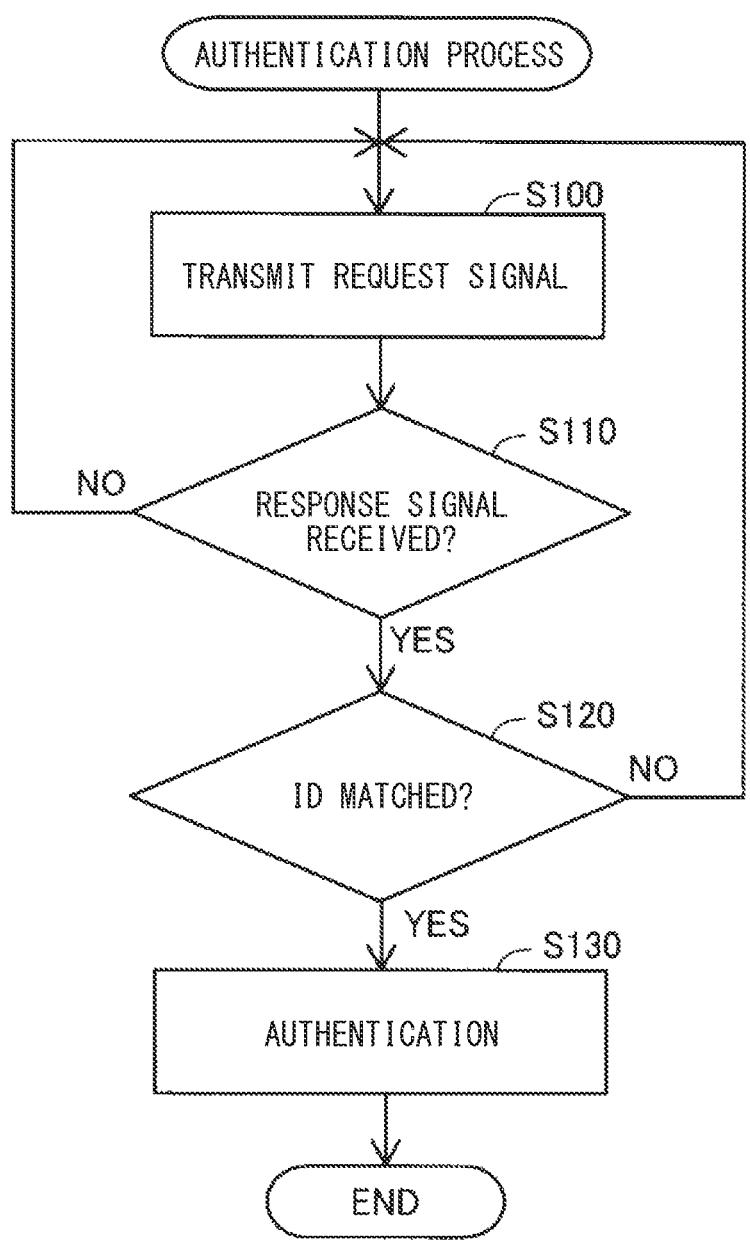
FIG. 4 is a flowchart showing a procedure of authentication processing executed in the position estimation system.

The authentication process will be described with reference to FIG. 4. The authentication process is executed prior to the position estimation process described later. The authentication process is executed when the position estimation device 100 has not completed the authentication of the portable device 200 and the authentication flag is in an off state.

In step S100, the main control unit 63 repeatedly transmits the request signal of the LF band to the periphery of the vehicle 400 via the LF transmitter 71. In step S110, when the main control unit 63 receives the response signal from the portable device 200 via the UHF receiver 72, the process proceeds to step S120, and the ID included in the response signal and the ID stored in the memory 64 are verified. When the IDs match, the main control unit 63 proceeds to step S130, authenticates that the portable device 200 is a legitimate portable device 200 registered in the position estimation device 100, and turns on the authentication flag in an on state. When the response signal is not received in step S110, or when the IDs do not match in step S120, the main control unit 63 returns the process to step S100 and transmits the request signal. In the present embodiment, this process is executed by the main control unit 63, but may be executed by the position estimation unit 62. The authentication flag may be turned off when the door is opened while the vehicle 400 is not started. In the above configuration, for example, when the vehicle 400 is not started, the authentication process is executed with the door closed, and the authentication is completed, and then the authentication flag is turned off with the door open as a trigger, the authentication is performed again.

Figure 5:
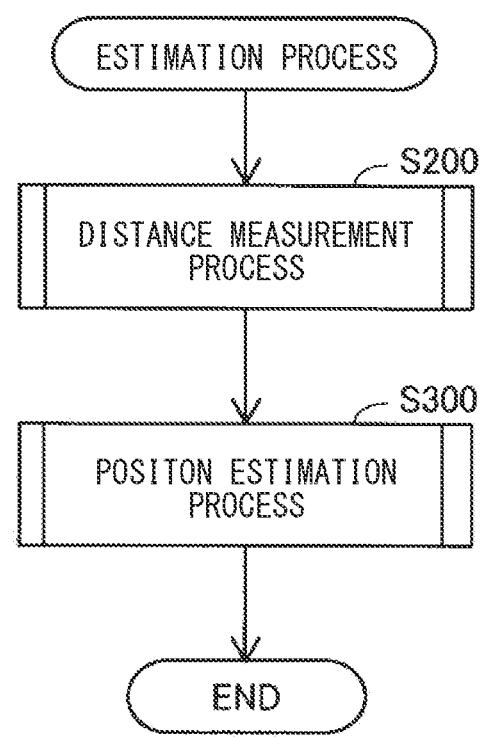
FIG. 5 is a flowchart showing an estimation processing.

When the authentication is completed, the position estimation unit 62 starts the estimation process shown in FIG. 5. The estimation process includes a distance measurement process (at step S200) and a position estimation process (at step S300). In the present embodiment, the distance measuring process (at step S200) is started in each of the sub in-vehicle devices 10 to 50 according to the instruction of the position estimation unit 62. Hereinafter, a mode in which the sub in-vehicle device 10 executes the distance measuring process will be described as an example. When the distance measurement process is started, the distance data acquisition unit 12 transmits a UWB signal to the periphery of the sub in-vehicle device 10 via the UWB transceiver 18 in parallel with execution of the distance measurement process. When the portable device side control unit 220 receives the UWB signal, it generates a UWB band response signal and transmits it via the UWB transmitter/receiver 253. In this way, the transmission/reception of the UWB signal is repeated between the sub in-vehicle device 10 and the portable device 200.

Figure 6:
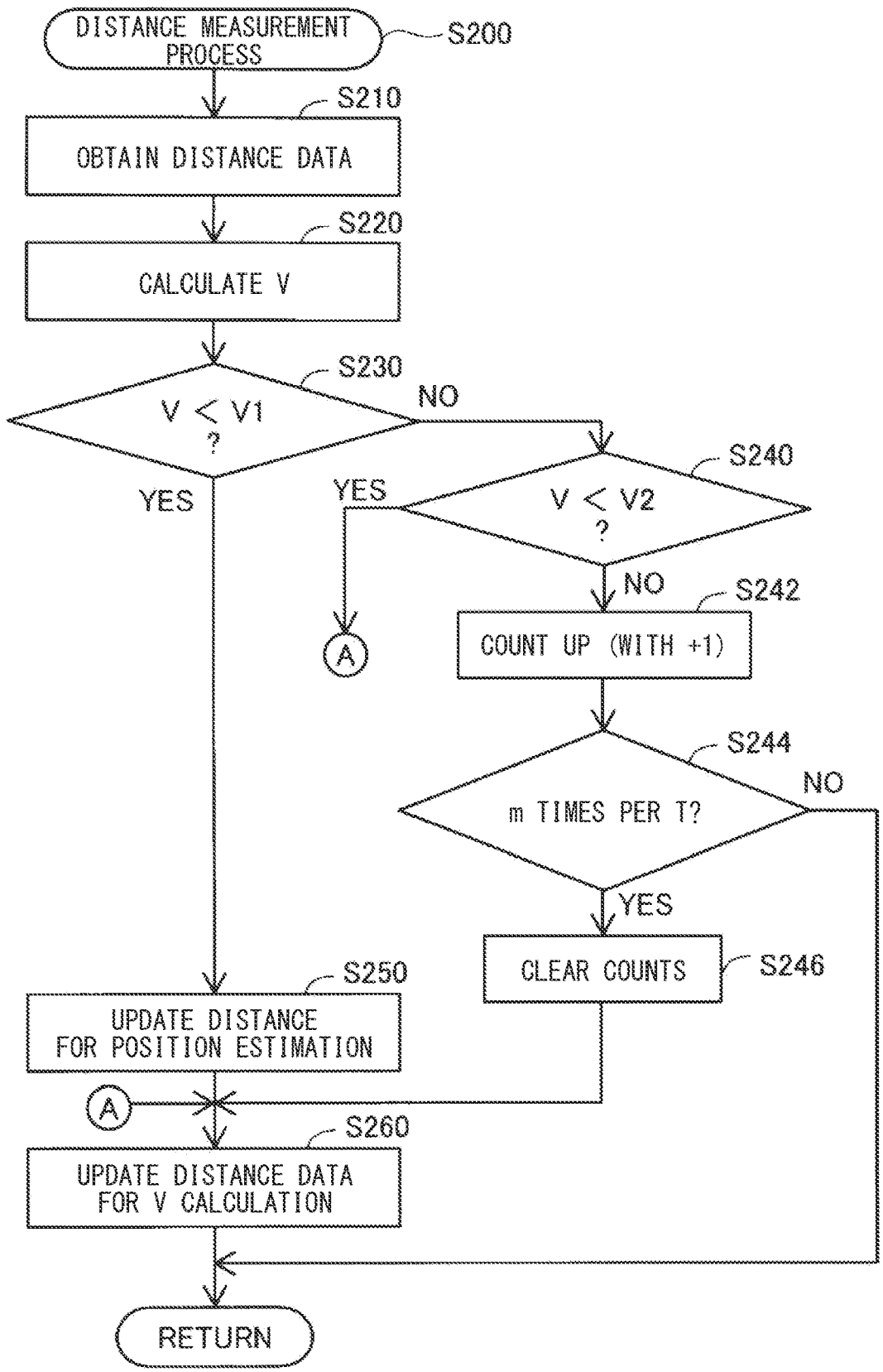
FIG. 6 is a flowchart showing a procedure of distance measurement processing in step S200 shown in FIG. 5.

As shown in FIG. 6, in step S210, the distance data acquisition unit 12 uses the flight time and radio wave speed of the UWB signal transmitted/received from the sub transceiver 17 to calculate and acquire the distance data between the sub in-vehicle device 10 and the portable device 200. In step S220, the movement speed calculation unit 13 calculates the movement speed V from the change between the previous distance data D2 acquired in the past and the current distance data D1 newly acquired in step S210.

In step S230, the updating unit 14 determines whether or not the moving speed V is less than the first speed V1. When the moving speed V is less than the first speed V1 ("YES" at step S230), the updating unit 14 advances the process to step S250, and updates the distance, specified as the position estimation distance between the sub in-vehicle device 10 and the portable device 200 and calculated in the past, using the distance data D1 calculated in step S210. In the present embodiment, the updating unit 14 updates the moving average of the distance data as the distance for position estimation using the current distance data D1. In step S260, the updating unit 14 updates the previous distance data D2 for calculating the moving speed with the current distance data D1.

When the moving speed V is equal to or higher than the first speed V1 ("NO" at step S230), the updating unit 14 advances the process to step S240 and determines whether or not the moving speed V is less than the second speed V2. In step S240, when the moving speed V is less than the second speed V2 ("YES" at step S240), the update unit 14 advances the process to step S260 described above. Therefore, in this case, since the above-mentioned step S250 is not executed, the distance data D1 acquired in step S210 is not used as the distance for position estimation, but the distance calculated in the past and specified as the position estimation distance between the sub in-vehicle device 10 and the portable device 200 is used as the latest distance between the sub in-vehicle device 10 and the portable device 200. Further, the previous distance data D2 for calculating the moving speed is updated with the current distance data D1 acquired in step S210. In the present embodiment, when the moving speed V is the second speed V2 or higher ("NO" at step S240), the updating unit 14 advances the process to step S242 and increments the count value by 1.

In step S244, the update unit 14 determines whether or not the movement speed V equal to or higher than the second speed V2 continues m times or more within the period T. When some communication failure occurs in the position estimation system 500 such that, for example, the sub transmitter/receiver 17 and the portable device 200 cannot transmit/receive signals temporarily, and then, the portable device 200 continues to move, the difference between the distance data calculated immediately before the signal cannot be transmitted/received temporarily and the distance data calculated after the signal can be transmitted and received continues to increase. As a result, the moving speed V may continue to indicate the second speed V2 or higher. The second speed V2, the period T, and the number of times m are the speed, the period, and the number of times that it can be determined that such a situation has occurred, and are predetermined by experiments and simulations.

When the determination in step S244 such that the movement speed V is equal to or higher than the second speed V2 does not continue m times within the period T ("NO" at step S244), the update unit 14 exits this processing routine. Therefore, in this case, since the above-mentioned steps S250 and S260 are not executed, the distance data D1 acquired in step S210 is not used as the distance for position estimation, but the distance calculated in the past and specified as the position estimation distance between the sub in-vehicle device 10 and the portable device 200 is used as the latest distance between the sub in-vehicle device 10 and the portable device 200. Further, the previous distance data D2 for calculating the moving speed is not updated with the current distance data D1 acquired in step S210.

When the determination in step S244 such that the movement speed V becomes V2 or higher continues m times within the period T ("YES" at step S244), the update unit 14 clears the count in step S246 and proceeds to step S260. Therefore, as in the case where the affirmative determination is made in step S240, the distance data D1 acquired in step S210 is not used as the distance for position estimation, but the distance calculated in the past and specified as the position estimation distance between the sub in-vehicle device 10 and the portable device 200 provides the latest distance between the sub in-vehicle device 10 and the portable device 200. Further, the previous distance data D2 for calculating the moving speed is updated with the current distance data D1 acquired in step S210. When the moving speed V is equal to or higher than the second speed V2 for m consecutive times within the period T, even if the communication failure is recovered, the moving speed already calculated based on the past distance data D2 before the update may be likely to deviate significantly from the actual moving speed. Therefore, in such a case, the process of step S260 is executed to update the previous distance data D2 for calculating the moving speed, so that the moving speed V calculated in the next step S230 becomes the actual moving speed. As described above, the distance measuring process is repeatedly executed. The process from step S230 to step S2560 corresponds to the "selective update process".

Figure 7:
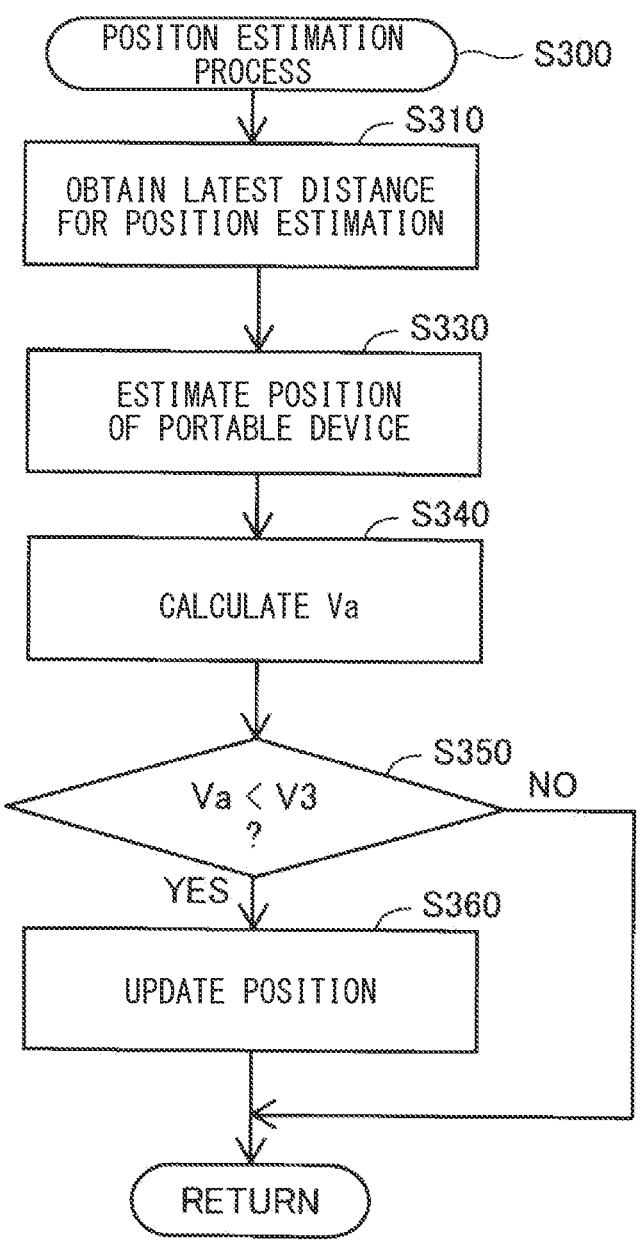
FIG. 7 is a flowchart showing a procedure of position estimation processing in step S300 shown in FIG. 5.

FIG. 7 is a flowchart showing a procedure of position estimation processing in step S300 shown in FIG. 5. In step S310, the position estimation unit 62 acquires the latest plurality of position estimation distances from the update units 14 of the sub in-vehicle devices 10 to 50, respectively. The "latest position estimation distance" means the updated position estimation distance when the position estimation distance is updated in the distance measurement process (at step S200) executed immediately before, and means the position estimation distance after the last update when the position estimation distance is not updated. In step S330, the position estimation unit 62 estimates the position of the portable device 200 with respect to the vehicle 400 by using the acquired position estimation distance.

Figure 8:
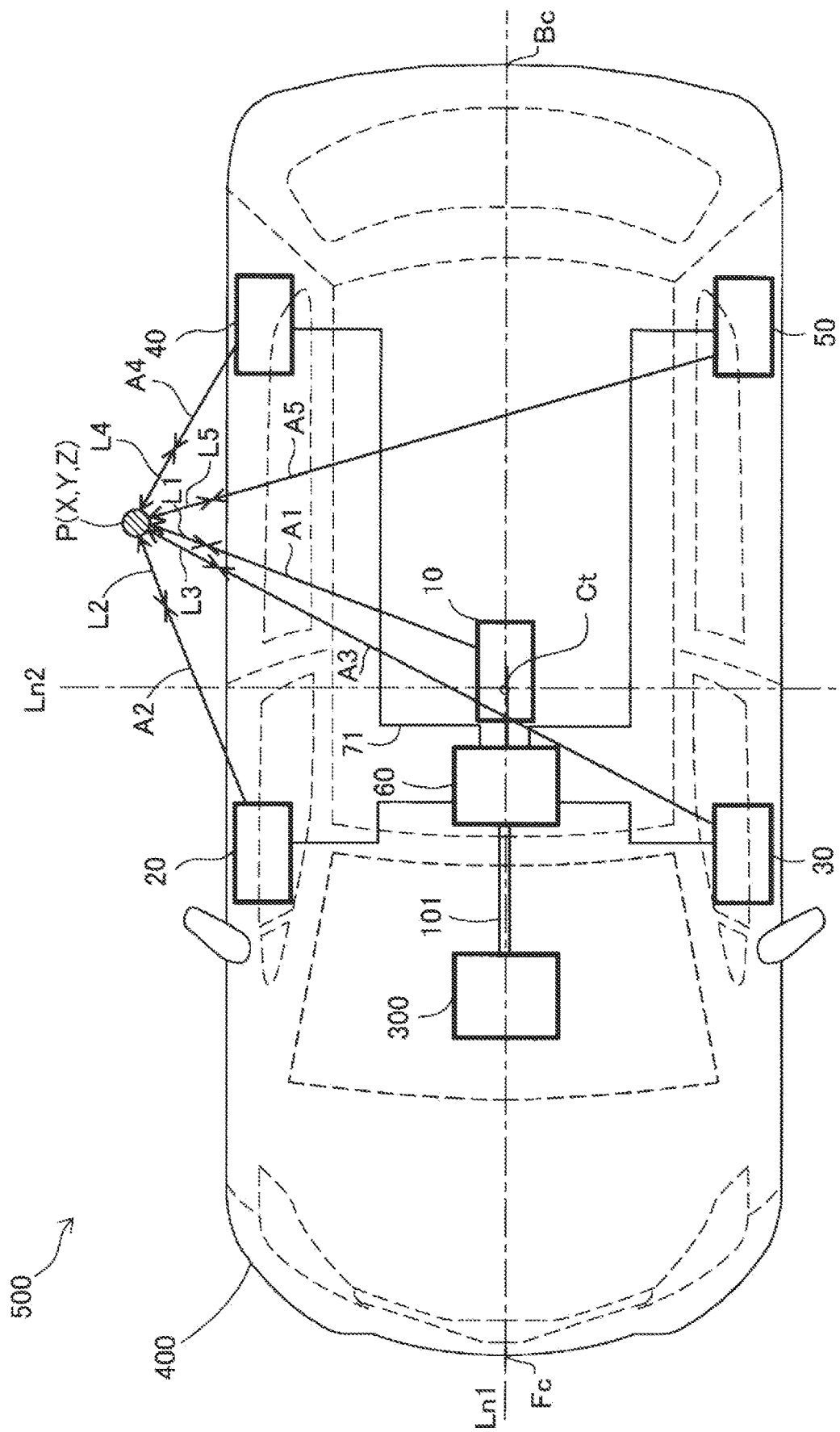
FIG. 8 is an image diagram for estimating the position of a portable device.

The process of step S330 in this embodiment will be described with reference to FIG. 8. FIG. 8 shows images of the latest plurality of position estimation distances A1, A2, A3, A4, and A5 acquired by the position estimation unit 62 at a certain time point. The position estimation distances A1, A2, A3, A4, and A5 are examples of the position estimation distances between the sub in-vehicle devices 10, 20, 30, 40, and 50 and the portable device 200, respectively. When describing and focusing on the sub in-vehicle device 10, the portable device 200 exists on a circumference of a circle having a distance A1 as a radius around the sub-vehicle device 10 as a center. The point P (X, Y, Z) shown in FIG. 8 is the true position coordinates of the portable device 200.

When the position of each sub in-vehicle device is the origin, the following equation 1 is established at the position P. The subscripts i in the formula 1 and the formulas 2 to 4 described later mean the numbers 1 to 5 in the present embodiment, and mean the numbers corresponding to the sub in-vehicle devices 10 to 50, respectively. Ai means the position estimation distance obtained by executing step S310. Further, (Xi, Yi, Zi) means the position coordinates P of the portable device 200, which is determined based on the latest position estimation distances of the sub in-vehicle devices 10 to 50.

Equation 1
[Math. 1]

$$A_i - \sqrt{X_i^2 + Y_i^2 + Z_i^2} = 0 \quad \text{(Math. 1)}$$

The distances L1, L2, L3, L4, and L5 shown in FIG. 8 are the differences between the latest position estimation distances of the sub in-vehicle devices 10, 20, 30, 40, and 50, and the distances between the sub in-vehicle devices 10 to 50 and the position P, and are calculated by the following equation 2.

Equation (2)
[Math. 2]

$$L_i = A_i - \sqrt{X_i^2 + Y_i^2 + Z_i^2} \quad \text{(Math. 2)}$$

greater than or equal to 1 and is 5 in this embodiment. The position estimation unit 62 estimates the coordinates (X, Y, Z) at which the sum of squares M is the minimum as the position P of the portable device 200.

Equation (3)
[Math. 3]

$$M = \Sigma_{i=1}^n [A_i - \sqrt{X_i^2 + Y_i^2 + Z_i^2}]^2 \quad \text{(Math. 3)}$$

Returning to FIG. 7, when the position is estimated, the position estimation unit 62 calculates the estimated position movement speed Va, which is the movement speed of the position, from the change between the previously estimated position and the newly estimated position in step S340. In step S350, when the estimated position movement speed Va is less than the third speed V3 predetermined based on the movement speed range of the user, the position estimation unit 62 advances the process to step S360 and updates the previously estimated position using the newly estimated position. In this case, the position estimation unit 62 sets the newly estimated position as the latest position of the portable device 200. The third speed V3 may be equal to the first speed V1. In step S350, when the estimated position moving speed Va is equal to or higher than the third speed V3, the position estimating unit 62 does not update the previously estimated position using the newly estimated position. In this case, the position estimation unit 62 sets the previously estimated position as the latest position of the portable device 200.

As described above, the position estimation unit 62 repeatedly estimates the position of the portable device 200 with respect to the vehicle 400, and when a predetermined condition is satisfied, updates the previously estimated position with the newly estimated position. The main control unit 63 controls the vehicle control device 300 using the estimated position.

According to the position estimation device 100 of the above embodiment, when the selective distance update process is executed and the moving speed V of the portable device 200 is less than the first speed V1 determined based on the moving speed range of the user ("YES" at step S230 in FIG. 6), the position estimation distance calculated in the past is updated using the newly calculated position estimation distance (at step S250), and the above update is not performed when the moving speed is equal to or higher than the first speed V1. Therefore, it is possible to suppress the estimation of the position of the portable device 200 by using the updated position estimation distance when the moving speed of the portable device 200 is an abnormal value equal to or higher than the first speed V1. Therefore, the accuracy of estimating the position of the portable device 200 with respect to the vehicle 400 can be improved. When an abnormal value equal to or higher than the first speed V1 is calculated as the moving speed V of the portable device 200, for example, the signal transmitted from the portable device 200 may be replaced with a direct wave or may be received as a reflected wave in addition to the direct wave due to the presence of an obstacle, so that it is assumed that the accuracy of the calculated distance may decrease due to these situations.

Further, in order to reduce the influence of the error, it is conceivable to increase the number of communications between the position estimation device 100 and the portable device 200 per unit time, but the power consumption of the position estimation device 100 and the portable device 200 may increase. According to the above embodiment, by executing the selective update process, the accuracy of estimating the position of the portable device 200 with respect to the vehicle 400 can be improved without increasing the power consumption.

According to the position estimation device 100 of the above-described embodiment, when the calculated moving speed V equal to or higher than the predetermined second speed V2, which is larger than the first speed V1 does not continue m times in a predetermined period T ("NO" at step S244 in FIG. 6), the previous distance data D2 for calculating the movement speed is not updated. When the calculated movement speed V is less than the first speed V1 ("YES" at step S230), or when the calculated movement speed V is equal to or higher than the first speed V1 and less than the second speed V2 ("YES" at step S240), or when the calculated movement speed V equal to or higher than the second speed V2 continues m times in the predetermined period T ("YES" at step S244), the previously acquired distance data D2 is updated using the newly acquired distance data D1 (at step S260). When the movement speed V is equal to or higher than the second speed V2 for m consecutive times within the period T, even if the communication failure is recovered, the movement speed calculated based on the past distance data D2 before the update may be highly likely to deviate significantly from the actual moving speed, and the position of the portable device 200 estimated by the position estimation process (at step S300) may be likely to deviate significantly from the actual position. In such a case, the distance data D2 for calculating the moving speed can be updated with the current distance data D2. Therefore, since the distance data D2 for calculating the moving speed is not updated due to the continuation of abnormal values, the moving speed V continues to indicate the first speed or higher ("NO" at step S230), and as a result, it can be suppressed that the distance for position estimation is not updated. Therefore, the accuracy of estimating the position of the portable device 200 with respect to the vehicle 400 can be further improved.

According to the above embodiment, the position estimation device 100 estimates the position of the portable device 200 with respect to the vehicle 400 by using each of the sub transceivers 17 in the plurality of sub in-vehicle devices 10 to 50 arranged at different positions of the vehicle 400. Therefore, the accuracy of estimating the position of the portable device 200 with respect to the vehicle 400 can be further improved as compared with the case of estimating the position using one sub-transmitter/receiver 17.

In the above embodiment, the predetermined speed condition, which is the condition for not updating the previous distance data D2 in the selective update process, is that the speed equal to or higher than a predetermined second speed V2, which is larger than the first speed V1, does not continue m times in the period T. On the other hand, the speed condition may be such that the moving speed V is equal to or higher than the first speed V1. In this case, when the moving speed V is equal to or higher than the first speed V1 ("NO" at step S230), the updating unit 14 omits the processing of steps S240 to S246 in FIG. 6 and does not update the previous distance data D2, and then, the process returns to step S210. Also in this form, it is possible to suppress the estimation of the position of the portable device 200 by using the updated position estimation distance when the speed V is the abnormal value of the first speed V1 or more. Therefore, the accuracy of estimating the position of the portable device 200 with respect to the vehicle 400 can be improved.

In the above embodiment, the distance data acquisition unit 12 may acquire the distance data to the portable device 200 based on the intensity of the received signal to by using the relationship between the intensity of the received signal and the distance obtained in advance.

B. Second Embodiment

Figure 9:
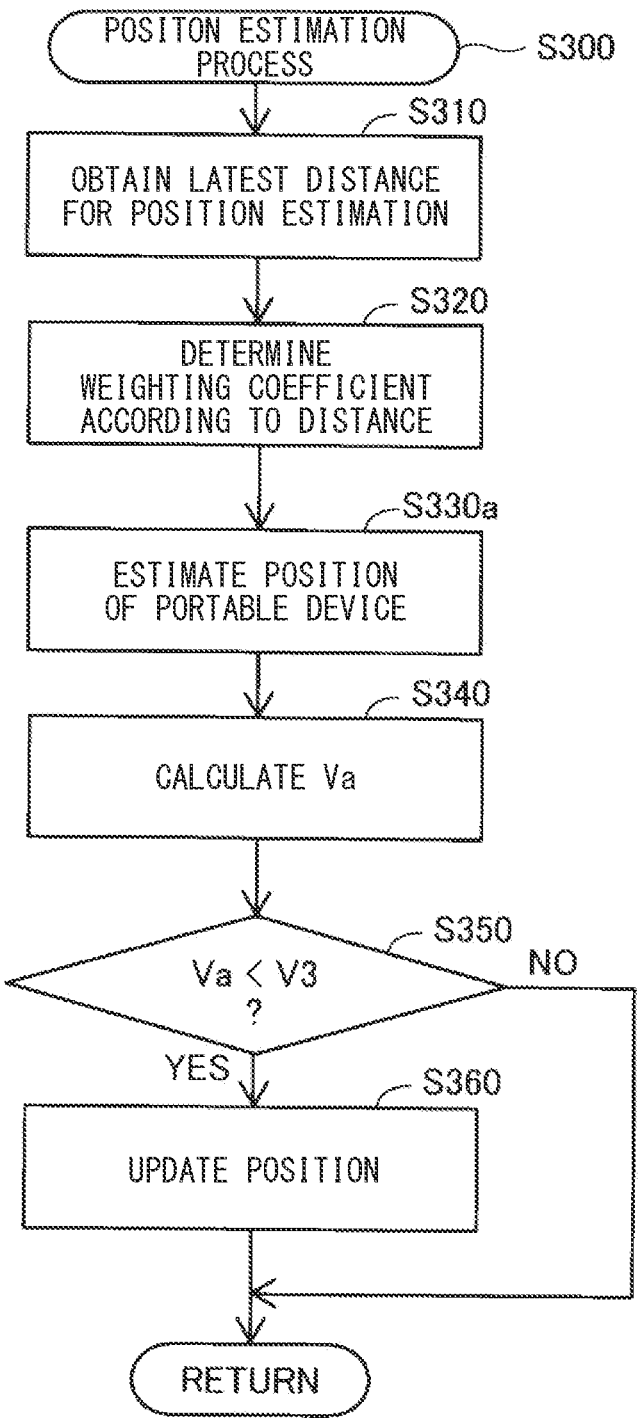
FIG. 9 is a flowchart showing a procedure of position estimation processing in step S300 according to the second embodiment.

FIG. 9 is a flowchart showing the procedure of the position estimation process in step S300 of FIG. 5 in the second embodiment, and corresponds to FIG. 7 of the first embodiment. In the second embodiment, the process of step S320 is added after step S310 of FIG. 7, and the process of step S330a is performed instead of step S330. Other processing procedures and device configurations are the same as those of the first embodiment. The same reference signs as in the first embodiment denote the same or substantially the same structural components, and the description of the first embodiment regarding the same reference signs are incorporated by reference.

In step S320, the position estimation unit 62 determines the weighting factor to be used for the position estimation such that the shorter the distance, the greater the degree of reflection in the position estimation with regard to the latest plurality of position estimation distances for each of the sub in-vehicle devices 10 to 50. In the present embodiment, the position estimation unit 62 maximizes the weighting factor for the shortest distance and minimizes the weighting factor for the maximum distance. The weighting factor for the other distances (i.e., intermediate distance) is smaller than the weighting factor for the shortest distance and larger than the weighting factor for the maximum distance. When there are a plurality of intermediate distances, the weighting factor for each intermediate distance may be the same, or the smaller the distance, the larger the weighting factor.

In step S330a, the position estimation unit 62 estimates the position using the weighting factor determined in step S320. In step S330a, the position is estimated using the following formula 4 instead of the formula 3 of the first embodiment. Here, w indicates a weighting factor.

Equation (4)
[Math. 4]

$$M = \Sigma_{i=1}^{n} w_i [A_i - \sqrt{X_i^2 + Y_i^2 + Z_i^2}]^2 \qquad \text{(Math. 4)}$$

As described above, the position estimation unit 62 increases the degree of reflection in the position estimation among the latest plurality of position estimation distances for each of the sub in-vehicle devices 10 to 50 as the distance is shorter, and estimates the position of the portable device 200 with respect to the vehicle 400.

It is considered that the shorter the position estimation distance calculated by using the signal received by the sub transmitter 17, the higher the reliability of the calculated distance. The reason is that there is a low possibility that an obstacle exists between the portable device 200 and the sub in-vehicle devices 10 to 50, and the signal reception strength is high. Therefore, according to the position estimation device 100 of this form, among the plurality of vehicle-side transmitters, the shorter the distance for position estimation from the portable device 200, the greater the degree of reflection in the position estimation, so that the accuracy of the estimation of the position of the portable device 200 with respect to the vehicle 400 can be further improved.

C: Third Embodiment

Figure 10:
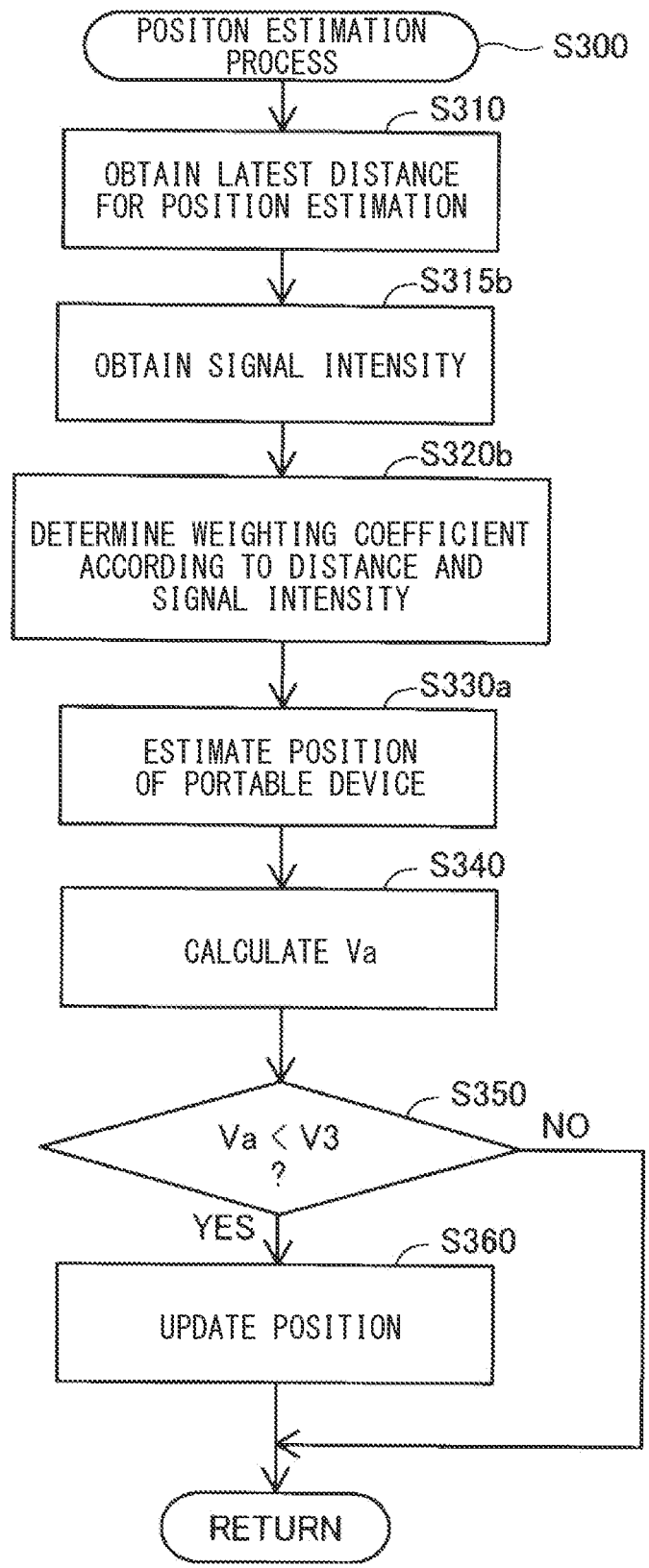
FIG. 10 is a flowchart showing a procedure of position estimation processing in step S300 according to the third embodiment.

FIG. 10 is a flowchart showing the procedure of the position estimation process in step S300 of FIG. 5 in the third embodiment, and corresponds to FIG. 7 of the first embodiment and FIG. 9 of the second embodiment. In the third embodiment, the process of step S315b is added after step S310 of FIG. 9, and the process of step S320b is performed instead of step S320a. Other processing procedures and device configurations are the same as those of the second embodiment.

In step S315b, the position estimation unit 62 obtains the signal strength used for calculating the shortest position estimation distance from the sub in-vehicle device that has calculated the shortest position estimation distance among the sub in-vehicle devices 10 to 50. In step S310, the position estimation unit 62 may receive the latest position estimation distance and the signal strength corresponding to the latest position estimation distance from each of the sub in-vehicle devices 10 to 50. In step S315b, the signal strength corresponding to the shortest position estimation distance among the signal strengths acquired in step S310 may be acquired.

In step S320b, the position estimation unit 62 determines the weighting factor according to the position estimation distance and the signal strength. In the present embodiment, when the strength of the signal used for calculating the shortest position estimation distance is equal to or higher than the predetermined first strength, the weighting factor is larger than a case where the strength is less than the first strength. The first strength is the strength when any of the sub in-vehicle devices 10 to 50 and the portable device 200 are sufficiently close to each other, and the first strength is predetermined by experiments and simulations using the relationship of the distance between the sub in-vehicle devices 10 to 50 and the portable device 200 and the signal strength, and the like. The first strength is, for example, the strength when the distance between any of the sub in-vehicle devices 10 to 50 and the portable device 200 is within 1 meter. For the weighting factor wa of the shortest distance, the weighting factor wb of the intermediate distance, and the weighting factor wc of the longest distance, the weighting factor for each distance acquired in step S310 is set so that the relationship of wa>wb>wc is established. The case of being configured in will be described as an example. When the signal strength of the shortest distance is equal to or higher than the first strength, the position estimation unit 62 sets the value of the factor wa to be a larger value while maintaining the above relationship. When the signal strength of the shortest distance is less than the first strength, the position estimation unit 62 sets the value of the weighting factor wa of the shortest distance to be a smaller value. For example, when the signal strength of the shortest distance is less than the first strength, the position estimation unit 62 may make the value of the weighting factor wa of the shortest distance to be equal to the value of the weighting factor wb of the intermediate distance.

It is considered that the higher the signal strength received by the vehicle-side transmitter/receiver, the higher the reliability of the calculated position estimation distance. Therefore, according to the position estimation device 100 of this form, the degree of reflection to the position estimation for at least the shortest position estimation distance is made larger when the signal is equal to or larger than the first intensity than when the signal is smaller than the first intensity. Thus, the accuracy of estimating the position of the portable device 200 with respect to the vehicle 400 can be further improved.

D: Fourth Embodiment

In the present embodiment, the position estimation unit 62 corrects the newly estimated position with a predetermined correction value in the position update process in step S360 of FIG. 7, and updates the previously estimated position. The correction value is predetermined according to the mounting environment of the sub in-vehicle devices 10 to 50 in the vehicle 400, and is stored in the memory 64 of the main in-vehicle device 60. The mounting environment is the material and thickness of the body of the vehicle 400, the arrangement location of each of the sub in-vehicle devices 10 to 50 in the vehicle 400, and the like.

According to the position estimation device 100 of this form, the position can be corrected by using the correction value according to the mounting environment of the sub in-vehicle devices 10 to 50 in the vehicle 400. Therefore, the accuracy of estimating the position of the portable device 200 with respect to the vehicle 400 can be further improved.

E: Fifth Embodiment

Figure 11:
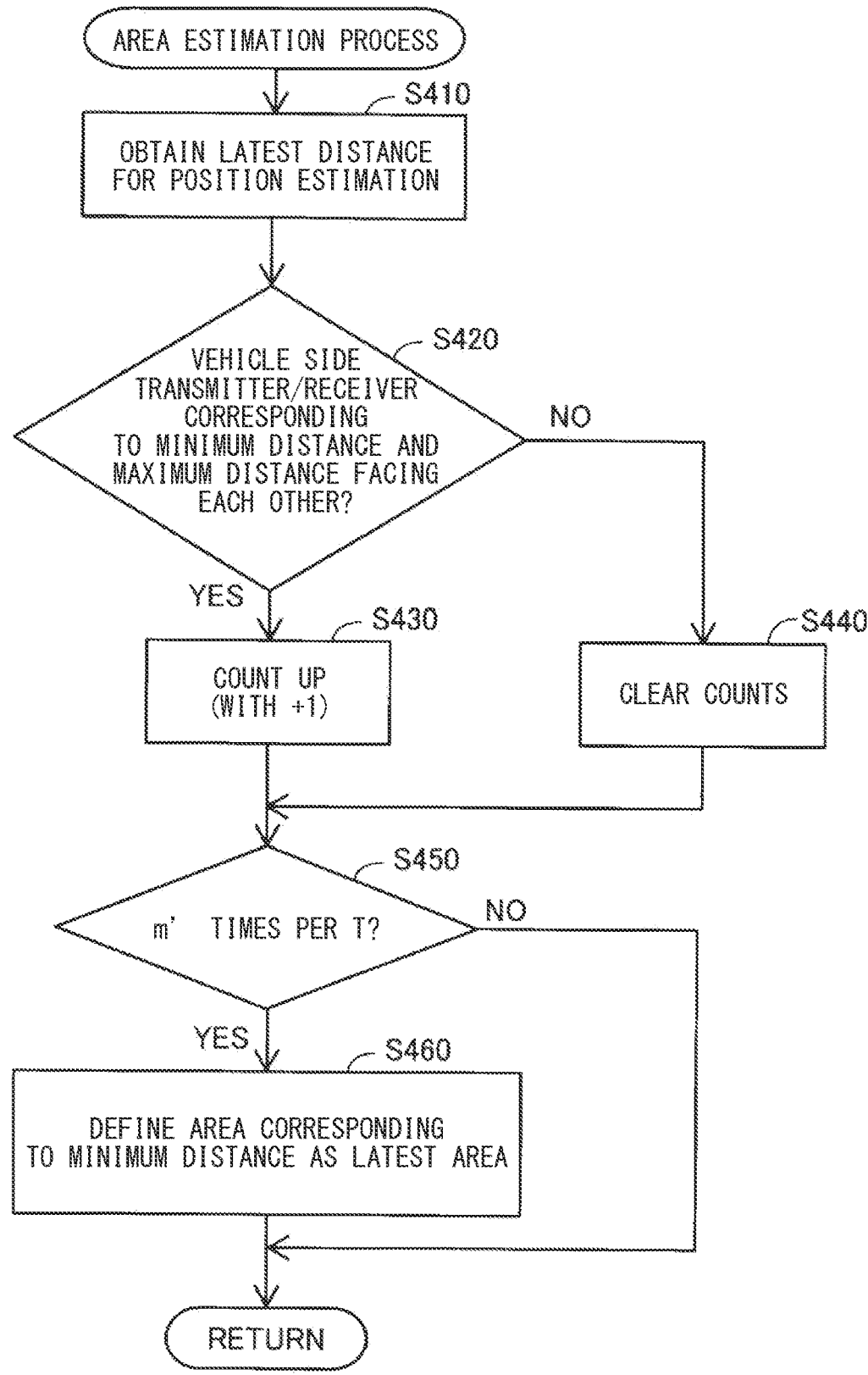
FIG. 11 is a flowchart showing a procedure of area estimation processing.

FIG. 11 is a flowchart showing the procedure of the area estimation process executed by the position estimation unit 62. The area estimation process is a process of estimating the area where the portable device 200 is located. In the present embodiment, a predetermined area centered on the sub in-vehicle device 10, for example, an area having a radius of 1 m is predetermined as a position estimation area of the sub in-vehicle device 10 and is stored in the memory 64.

The same feature applies to the sub in-vehicle devices 20 to 50. The area estimation process may be executed in place of the position estimation process of step S300 in FIG. 5 in the first embodiment, or may be executed in parallel with step S300.

In step S410, similarly to step S310 shown in FIG. 7 of the first embodiment, the position estimation unit 62 obtains the latest position estimation distances for each of the plurality of sub in-vehicle devices 10 to 50, that are, five position estimation distances.

In step S420, the position estimation unit 62 determines whether the sub transmitter and receiver corresponding to the shortest distance and the sub transmitter and receiver corresponding to the longest distance among the position estimation distances acquired in step S410 are opposed to each other with sandwiching the center Ct of the vehicle 400 therebetween. In the example shown in FIG. 1, the sub in-vehicle device 20 and the sub in-vehicle device 50 face each other with the vehicle center Ct in between, and the sub in-vehicle device 30 and the sub in-vehicle device 40 face each other with the vehicle center Ct in between. For example, when the shortest distance is acquired from the sub in-vehicle device 20 and the longest distance is acquired from the sub in-vehicle device 50, the position estimation unit 62 advances the process to step S430 and increments the count value by 1. When the negative determination in step S420 is made, the position estimation unit 62 advances the process to step S440 and clears the count value.

In step S450, the update unit 14 determines whether it has continued for a predetermined m' times within a predetermined period T' that the sub transmitter corresponding to the shortest distance and the sub transmitter corresponding to the longest distance face each other with the center Ct of the vehicle 400 in between. The period T' and the number of times m' are defined by the period and the number of times that it is possible to prevent the area of the positions of the portable device 200 estimated by the position estimation unit 62 from being frequently changed between the position estimation area formed by the sub in-vehicle device 20 and the position estimation area formed by the sub in-vehicle device 40 in a relatively short period of time when the portable device 200 is located between the sub in-vehicle device 20 and the sub in-vehicle device 40 shown in FIG. 1. The period T' and the number of times m' are determined in advance by experiments and simulations. When the affirmative determination is made in step S450, it can be determined that the portable device 200 is located in the position estimation area formed by the sub transmitter/receiver 17 corresponding to the shortest distance. The conditions of steps S420 and S450 are also referred to as "area estimation conditions".

When the affirmative determination is made in step S450, the update unit 14 proceeds to step S460 and estimates the area corresponding to the shortest distance as the latest area of the device 200. When the negative determination in step S450 is made, the position estimation unit 62 exits this processing routine.

According to the position estimation device 100 of this form, when the area estimation condition, including a feature such that the sub transmitter/receiver corresponding to the shortest position estimation distance and the sub transmitter/receiver corresponding to the longest position estimation distance face each other with the center Ct of the vehicle 400 in between, is satisfied, it can be estimated that the portable device 200 is located in the position estimation area formed by the sub transmitter/receiver corresponding to the shortest position estimation distance. Further, the vehicle 400 can be controlled by using the area where the portable device 200 is located, and it is possible to suppress the frequent change of the control contents.

In the fifth embodiment, the position estimation unit 62 may omit the processing of steps S430 to S450, and set the area corresponding to the shortest position estimation distance as the latest area (at step S460) when the sub transmitter/receiver corresponding to the shortest position estimation distance and the sub transmitter/receiver corresponding to the longest position estimation distance are opposed to each other with the center Ct of the vehicle 400 in between ("YES" at step S420).

F. Other Embodiments

In the position estimation device 100 of the above embodiment, the CPU 61 of the main in-vehicle device 60 may realize at least one of the functions of the distance data acquisition unit 12, the movement speed calculation unit 13, and the update unit 14 in the sub in-vehicle devices 10 to 50. For example, the sub in-vehicle devices 10 to 50 may include the distance data acquisition unit 12, and the CPU of the main in-vehicle device 60 may realize the functions of the movement speed calculation unit 13 and the update unit 14. Alternatively, the sub in-vehicle devices 10 to 50 may include a sub transceiver 17, and the CPU 61 of the main in-vehicle device 60 may realize the functions of the distance data acquisition unit 12, the movement speed calculation unit 13, and the update unit 14. Further, in the position estimation device 100 of the above embodiment, in addition to the sub transceivers 17 of the sub in-vehicle devices 10 to 50, the distance data between the main in-vehicle device 60 and the portable device 200 may be acquired based on the flight time and the signal strength of the signals transmitted to/received from the main transceiver 70 of the main in-vehicle device 60. In this case, the main transceiver 70 of the main in-vehicle device 60 corresponds to the "vehicle-side transceiver" like the sub transmitters 17 of the sub in-vehicle devices 10 to 50.

Figure 12:
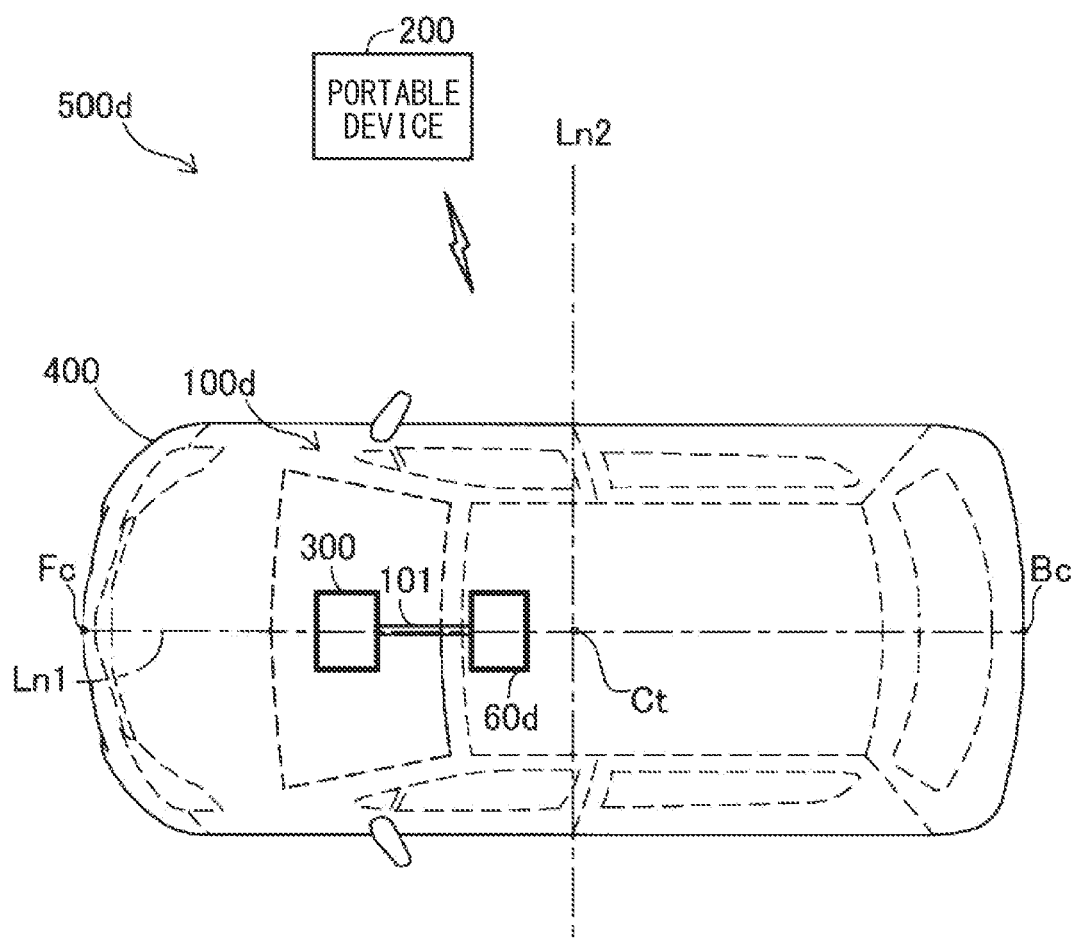
FIG. 12 is a diagram showing a position estimation system according to another embodiment.
Figure 13:
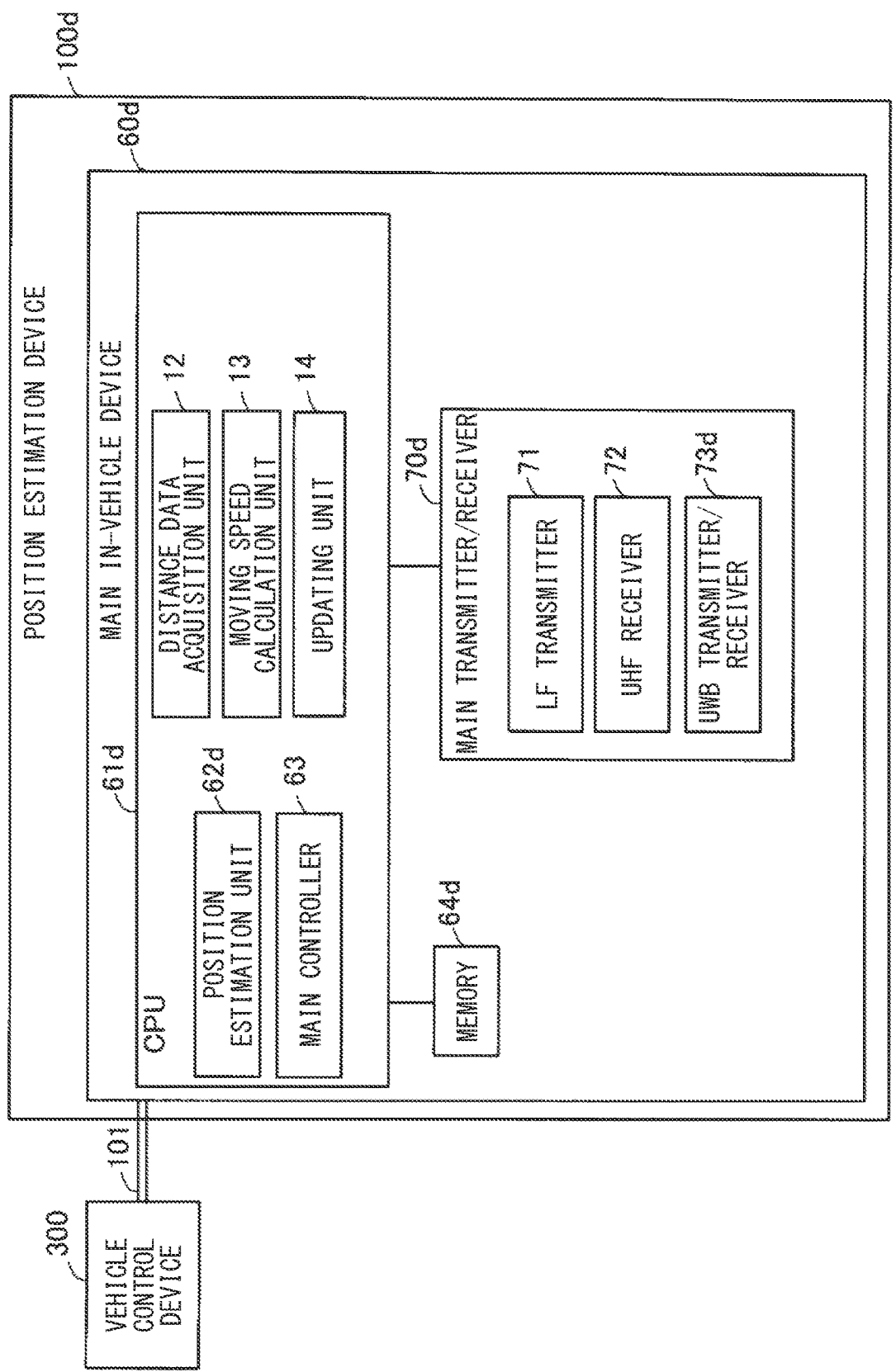
FIG. 13 is a block diagram showing a configuration of a position estimation device according to another embodiment.

In the above embodiment, the position estimation device 100 of the position estimation system 500 includes a main transmitter/receiver 70 and five sub transmitter/receivers 17 as vehicle-side transmitter/receivers capable of communicating with the portable device 200. On the other hand, the number of vehicle-side transmitter/receivers included in the position estimation device 100 may be one. The position estimation system 500d shown in FIG. 12 is different from the first to fifth embodiments in that the position estimation device 100d does not include the sub in-vehicle devices 10 to 50 but includes only the main in-vehicle device 60d. In this embodiment, as shown in FIG. 13, the CPU 61d of the main in-vehicle device 60d reads out and executes the program stored in the memory 64d, thereby functioning as the distance data acquisition unit 12, the moving speed calculation unit 13, the updating unit 14 and the position estimation unit 62d. In the main in-vehicle device 60d, distance data is calculated and acquired, movement speed is calculated, and the first update process and the second updating process are performed using UWB signals transmitted and received via the UWB transmitter 73d and the UWB receiver 74d of the main transmitter/receiver 70d. The position estimation unit 62d acquires the latest position estimation distance from the update unit 14, and can determine that the portable device 200 is positioned on a circumference whose radius is the latest position estimation distance centered on the main in-vehicle device 60d. Also in this embodiment, the accuracy of estimating the position of the portable device 200 with respect to the vehicle 400 can be improved as in the first embodiment.

In the above embodiment, the wireless communication between the portable device side transceiver 250 and the position estimation device 100 includes communication using radio waves in the LF band, the UHF band, and the UWB band. On the other hand, wireless communication may include communication using BLE (Bluetooth Low Energy, registered trademark) standard in place of or in addition to communication using radio waves in the LF band and UHF band. Further, the wireless communication between the transmitter/receiver 250 on the portable device side and the position estimation device 100 may be only communication using radio waves in the UWB band. In this case, the portable device side transmitter/receiver 250 of the portable device 200 may include only the UWB transceiver 253, and the main transceiver 70 of the position estimation device 100 may not include the LF transmitter 71 and the UHF receiver 72.

The flight time may be measured by any of the following signal transmission/reception modes. The numerical values of 1 to 10 attached to the UWB signal are numerical values for explaining the mode of transmission/reception. (i) A mode in which the portable device 200 transmits the UWB signal 1, the sub in-vehicle device 10 receives the UWB signal 1 and transmits the UWB signal 2, and the portable device 200 receives the UWB signal 2. (ii) A mode in which the portable device 200 transmits the UWB signal 3, the sub in-vehicle device 10 receives the UWB signal 3 and transmits the UWB signal 4, the portable device 200 receives the UWB signal 4 and transmits the UWB signal 5, and the sub in-vehicle device 10 receives the UWB signal 5. (iii) A mode in which the sub in-vehicle device 10 transmits a UWB signal 6, the portable device 200 receives the UWB signal 6 and transmits the UWB signal 7, and the sub in-vehicle device 10 receives the UWB signal 7. (iv) A mode in which the sub in-vehicle device 10 transmits the UWB signal 8, the portable device 200 receives the UWB signal 8 and transmits the UWB signal 9, the sub in-vehicle device 10 receives the UWB signal 9 and transmits the UWB signal 10, and the portable device 200 receives the UWB signal 10. In the modes of (i) and (iii), the distance data acquisition unit 12 may acquire the flight time from the portable device 200 and calculate the distance data.

The control circuit and method described in the present disclosure may be implemented by a special purpose computer which is configured with a memory and a processor programmed to execute one or more particular functions embodied in computer programs of the memory. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer program may be stored in a computer-readable non-transitory tangible storage medium as instructions to e executed by a computer.

The present disclosure should not be limited to the embodiments described above, and various other embodiments may be implemented without departing from the scope of the present disclosure. For example, the technical features in the embodiment corresponding to the technical features in the form described in the summary may be used to solve some or all of the above-described problems, or to provide one of the above-described effects. In order to achieve a part or all, replacement or combination can be appropriately performed. Also, some of the technical features may be omitted as appropriate.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

What is claimed is:

1. A position estimation device mounted on a vehicle for estimating a position of a portable device carried by a user of the vehicle, the position estimation device comprising: at least one vehicle-side transmission and reception device that transmits and receives a signal to and from the portable device; a distance data acquisition unit that acquires distance data between the portable device and the vehicle-side transmission and reception device using the signal received by the vehicle-side transmission and reception device from the portable device; a movement speed calculation unit that calculates a movement speed of the portable device based on a change between a current distance data that is a currently acquired distance data and a previous distance data that is a distance data acquired before the current distance data;

an update unit that updates a position estimation distance for estimating the position of the portable device with respect to the vehicle using the current distance data when the movement speed is less than a first speed preliminarily determined based on a moving speed range of the user, and does not update the position estimation distance using the current distance data when the movement speed is equal to or higher than the first speed; and a position estimation unit that estimates the position of the portable device with respect to the vehicle using the position estimation distance, wherein the position estimation device is configured to provide remote keyless entry or smart entry for the vehicle such that when the user of the vehicle operates the portable device, a door of the vehicle is opened, closed, unlocked, or locked.

2. The position estimation device according to claim 1, wherein: in the selective update process, the update unit further: updates the previous distance data for calculating the movement speed using the current distance data when the movement speed is less than the first speed; and does not update the previous distance data for calculating the movement speed using the current distance data when a predetermined speed condition including that the movement speed is equal to or higher than the first speed is satisfied.

3. The position estimation device according to claim 2, wherein: the predetermined speed condition in the selective update process includes: that a calculated movement speed, equal to or higher than a second speed preliminarily determined to be higher than the first speed, does not continue for a predetermined numerical number of times in a predetermined period; and in the selective update process, the update unit further: updates the previous distance data using the current distance data when an acquired movement speed is equal to or higher than the first speed and lower than the second speed, or when the acquired movement speed equal to or higher than the second speed continues for the predetermined numerical number of times in the predetermined period; and does not update the previous distance data using the current distance data when the speed condition is satisfied.

4. The position estimation device according to claim 1, wherein: the at least one vehicle-side transmission and reception device includes a plurality of vehicle-side transmission and reception devices arranged at different positions of the vehicle; the distance data acquisition unit acquires the distance data for each of the plurality of vehicle-side transmission and reception devices; the movement speed calculation unit calculates the movement speed for each of the plurality of vehicle-side transmission and reception devices; the update unit executes the selective update process for each of the plurality of vehicle-side transmission and reception devices; and the position estimation unit: estimates the position of the portable device with respect to the vehicle using a latest position estimation distance for each of the plurality of vehicle-side transmission and reception devices; and increases a degree of reflection in a position estimation as the position estimation distance is shorter when estimating the position of the portable device.

5. The position estimation device according to claim 4, wherein: the position estimation unit further: acquires a strength of a signal used for calculating at least a shortest position estimation distance among the latest position estimation distance for each of the plurality of vehicle-side transmission and reception devices; and estimates the position of the portable device with respect to the vehicle by increasing the degree of reflection in the position estimation to be larger in a case where the strength of the signal is equal to or larger than a predetermined first intensity than a case where the strength of the signal is smaller than the predetermined first intensity.

6. The position estimation device according to claim 4, wherein: at least two of the plurality of vehicle-side transmission and reception devices are respectively disposed on one side and an other side of a vehicle center, which is a midpoint of a line segment connecting a center portion of a front end of the vehicle in a vehicle width direction and a center portion of a rear end of the vehicle in the vehicle width direction; the position estimation unit estimates the position of the portable device in an area provided by the vehicle-side transmission and reception device corresponding to a shortest position estimation distance when an area estimation condition is satisfied; and the area estimation condition includes a condition that the vehicle-side transmission and reception device corresponding to the shortest position estimation distance and the vehicle-side transmission and reception device corresponding to a longest position estimation distance are opposed to each other with sandwiching the vehicle center therebetween among latest position estimation distances for each of the vehicle-side transmission and reception devices.

7. The position estimation device according to claim 4, wherein: the position estimation unit: estimates the position of the portable device with respect to the vehicle using an updated position estimation distance for each of the plurality of vehicle-side transmission and reception devices; calculates an estimation position movement speed that is the movement speed of an estimated position of the portable device according to a change between the position of the portable device previously estimated and the position of the portable device newly estimated; and when the estimation position movement speed is less than a third speed preliminarily determined based on the movement speed range of the user, updates the position of the portable device previously estimated by correcting the position of the portable device newly estimated using a correction value that is preliminarily determined according to a mounting environment of the plurality of vehicle-side transmission and reception devices on the vehicle.

8. The position estimation device according to claim 1, wherein: the distance data acquisition unit calculates the distance data between the vehicle-side transmission and reception device and the portable device using a chronological time required for transmitting and receiving the signal between the portable device and the vehicle-side transmission and reception device.

9. The position estimation device according to claim 1, further comprising: a main in-vehicle device communicable with a sub in-vehicle device including the vehicle-side transmission and reception device, wherein: the sub in-vehicle device includes the distance data acquisition unit, the movement speed calculation unit, and the update unit; and the main in-vehicle device includes the position estimation unit.

10. A position estimation system comprising: the position estimation device according to claim 1; and the portable device.

11. A position estimation method for estimating a position of a portable device carried by an user of a vehicle with respect to the vehicle, the vehicle is equipped with a vehicle-side transmission and reception device that transmits and receives a signal to and from the portable device, the position estimation method comprising: acquiring a distance data between the portable device and the vehicle-side transmission and reception device using the signal received by the vehicle-side transmission and reception device from the portable device; calculating a movement speed of the portable device based on a change between a current distance data that is a currently acquired distance data and a previous distance data that is a distance data acquired before the current distance data; updating a position estimation distance for estimating the position of the portable device with respect to the vehicle using the current distance data when the movement speed is less than a first speed preliminarily determined based on a movement speed range of the user; not updating the position estimation distance using the current distance data when the movement speed is equal to or larger than the first speed and estimating the position of the portable device with respect to the vehicle according to the position estimation distance; and performing at least one of: a door open operation; a door close operation; a door unlock operation; and a door lock operation in response to a remote keyless entry system or a smart entry system.

* * * * *